Figure 1:
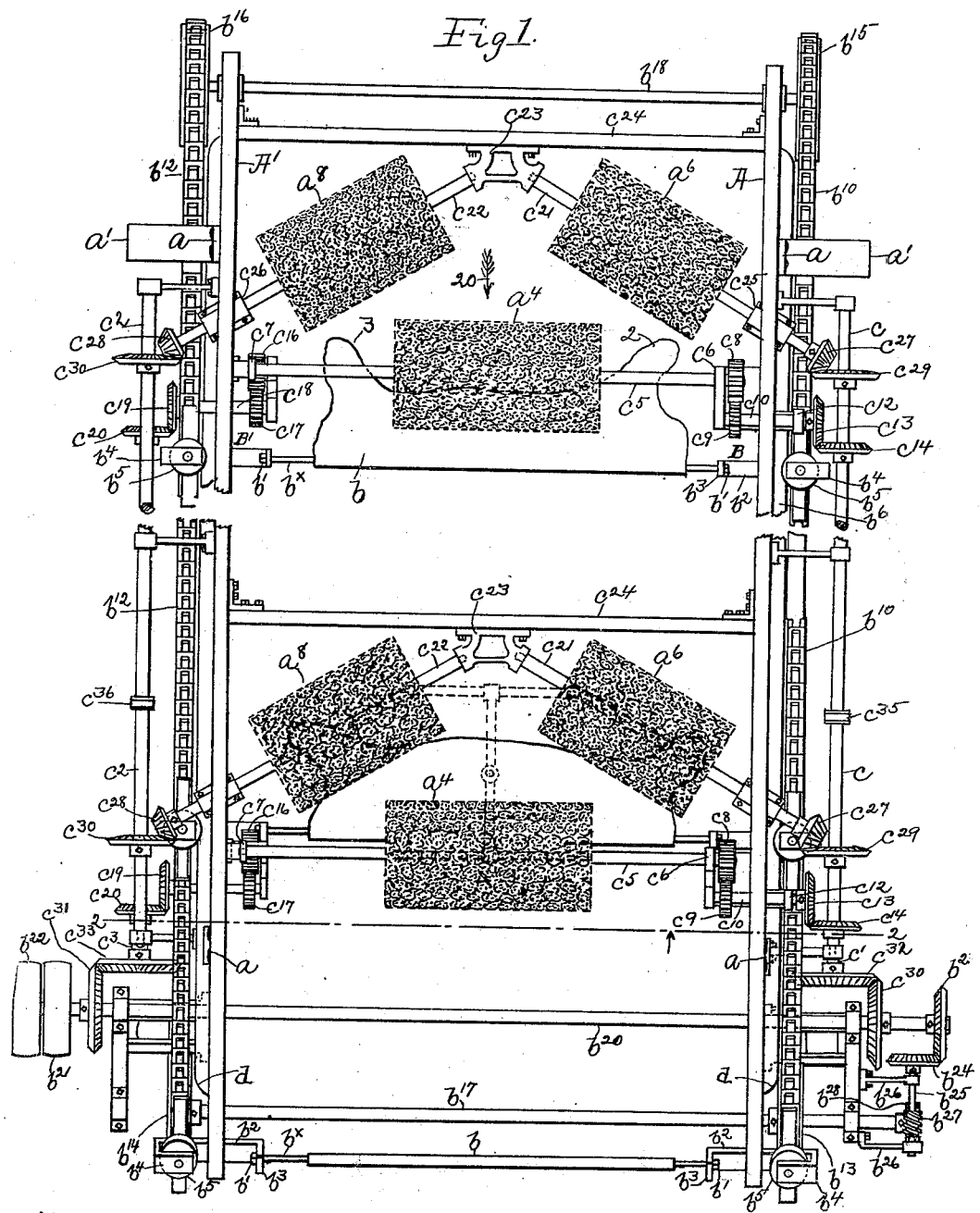

(No Model.) 2 Sheets—Sheet 1.

A. F. JONES.
APPARATUS FOR COLORING SKINS.

No. 513,642. Patented Jan. 30, 1894.

Witnesses
Howard F. Eaton
J. Murphy

Inventor
Albert F. Jones
by Jas. H. Churchill
Atty.

(No Model.) 2 Sheets—Sheet 2.

A. F. JONES.
APPARATUS FOR COLORING SKINS.

No. 513,642. Patented Jan. 30, 1894.

Witnesses.
Howard F. Eaton
J. Murphy

Inventor.
Albert F. Jones
by Jas. H. Churchill
Atty.

UNITED STATES PATENT OFFICE.

ALBERT F. JONES, OF SALEM, MASSACHUSETTS.

APPARATUS FOR COLORING SKINS.

SPECIFICATION forming part of Letters Patent No. 513,642, dated January 30, 1894.

Application filed May 31, 1893. Serial No. 476,034. (No model.)

*To all whom it may concern:*

Be it known that I, ALBERT F. JONES, residing in Salem, in the county of Essex and State of Massachusetts, have invented an Improvement in Apparatus for Coloring Skins, of which the following description, in connection with the accompanying drawings, is a specification, like letters and numerals on the drawings representing like parts.

This invention relates to an apparatus for coloring skins and is an improvement upon the apparatus shown and described in United States Patent No. 498,120, granted to me May 23, 1893. In the patent referred to, the skin to be colored is acted upon by a series of sets of brushes, each set consisting of two straight brushes.

In practice, I have ascertained that with straight brushes as shown in the patent referred to, the body of the skin or hide is smoothed out and evenly colored while those portions or pieces of the skin or hide which extend at an angle from the body are not smoothed out in their natural direction, but are bent or turned by the brushes at an angle to their natural position or toward the body of the skin or hide, thereby creasing or crinkling the hide or skin at or near the point where the leg portions join the body portion, which results in an uneven or defective coloring of the skin.

My present invention has for one of its objects to obviate the creasing or crinkling of the hide or skin and thereby effect a more even and perfect coloring of the same, and I effect this result by means of coloring brushes arranged at an angle to one another, whereby the skin is acted upon in different directions by the brushes and is stretched or put under tension, and into the condition most favorable to receive the coloring liquid. The brushes referred to, are preferably arranged in sets and for the best results, each set is preferably composed of a pair of brushes to act on the center or body portion of the skin, and two pairs of end brushes to act on the ends or shanks of the skin, the said end brushes being arranged at an angle to the body brushes. The skin will preferably be supported upon wires or rods attached to endless carriers preferably sprocket chains, and another feature of my present invention consists in a novel construction of gearing for driving the brushes and endless carriers for the skins.

My invention further consists in a novel construction of apparatus as will be described whereby the endless carriers are maintained taut as the skin is being acted upon by the brushes, thereby keeping the skin support straight as it passes the brushes and preventing the skin from crinkling at its center.

These and other features of my invention will be pointed out in the claims at the end of this specification.

Figure 2:
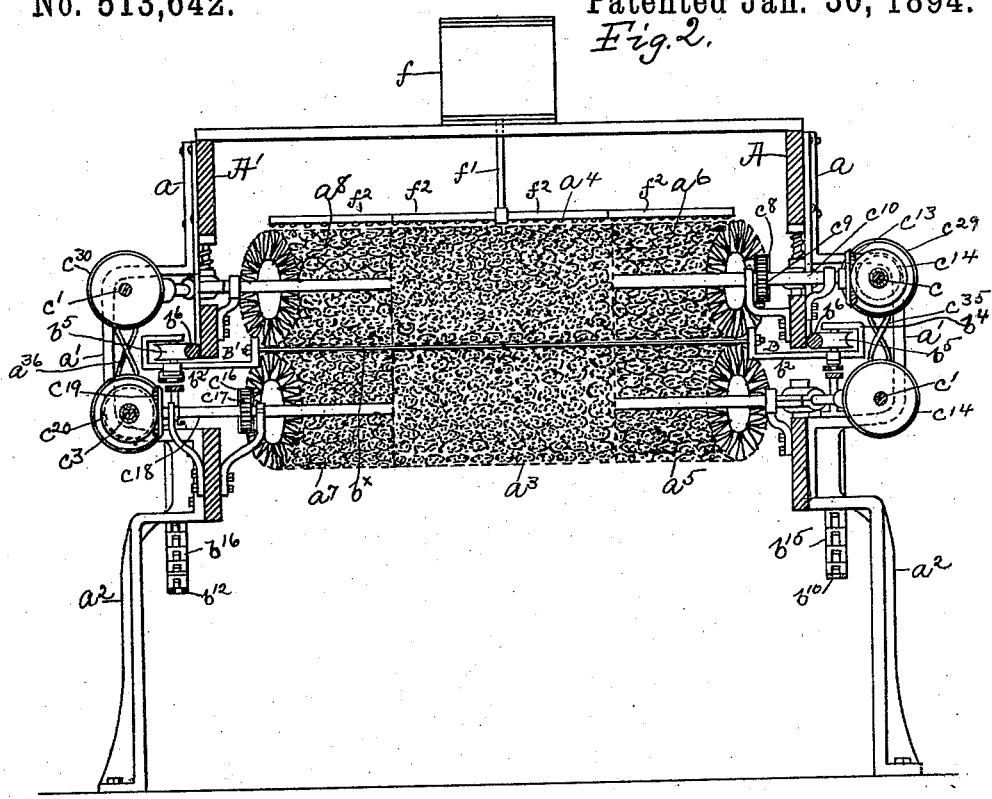
Figure 3:
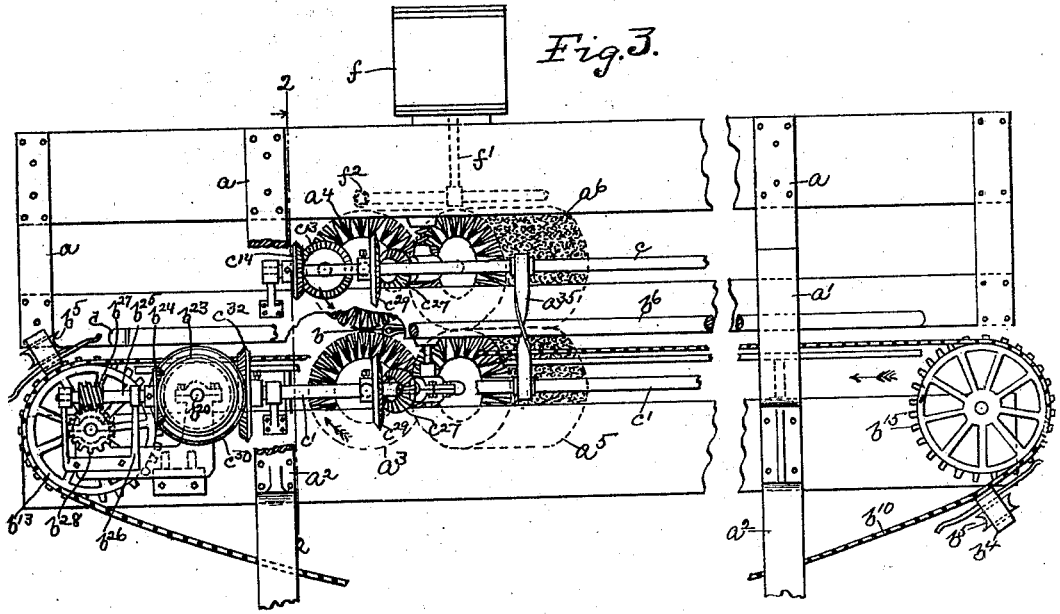

Figure 1 is a plan view partially broken out to save space in the drawing of an apparatus embodying my invention; Fig. 2, a transverse section of the apparatus shown in Fig. 1 taken on the line 2—2 looking in the direction of the arrow thereon; Fig. 3, a side elevation partially broken out of the apparatus shown in Fig. 1 looking toward the left in said figure.

A A' represent the sides of a supporting framework for the operating parts of the apparatus, the said sides being herein shown as composed of pieces secured together by suitable tie-bars $a$, of any desired or suitable number. Each tie-bar $a$ is provided as herein shown (see Fig. 2) with an outwardly bent or offset portion $a'$ for a purpose as will be described, and the said tie-bars are preferably extended down and bent outward to form supporting legs $a^2$ for the framework.

The framework referred to, supports in suitable bearings the coloring brushes arranged to act on the skin in different directions, and I prefer to arrange the brushes in sets, and for the best results, I prefer to have each set consist of two brushes $a^3 a^4$ arranged one above the other and which I prefer to designate as body brushes, and preferably four co-operating end brushes $a^5$ $a^6$, $a^7$ $a^8$, hereinafter designated as the end brushes, which end brushes are arranged as shown in pairs one above the other at the opposite ends of the body brushes, and which in accordance with my invention, are set at an angle to the body brushes.

In the present embodiment of my invention, the hide or skin $b$ to be colored, is designed to pass between the upper and lower brushes of each set, which may be accomplished in substantially the same manner as described in the patent referred to, that is, the skin or hide is folded or laid over a support $b^x$, which may and preferably will be a wire, bar or rod, detachably fastened by nuts $b'$ to roller or pulley-supporting castings, bars or frames B, B', preferably made as herein shown, and each consisting of a horizontal bar $b^2$ provided at one end with a lug or flange $b^3$ to which the skin or hide support $b^x$ is fastened by the nut $b'$, and having at its other end a right angle flange $b^4$ forming bearings with the bar $b^2$ for a pulley, roller or wheel $b^5$, the said pulleys on opposite sides of the machine co-operating with devices, shown as rods $b^6$ secured to the outside of the sides A A' and extended substantially the length of the apparatus, for a purpose as will be described.

The bars or frames B B' on opposite sides of the machine are secured or otherwise fastened to endless carriers, preferably sprocket chains $b^{10}$, $b^{12}$, extended on the outside of the framework of the machine from one end to the other and passed about sprocket wheels $b^{13}$, $b^{14}$, at the rear end of the machine and about similar sprocket wheels $b^{15}$ $b^{16}$ at the front end of the machine, the sprocket wheels $b^{13}$ $b^{14}$ being mounted upon a shaft $b^{17}$, and the sprocket wheels $b^{15}$ $b^{16}$ being mounted upon a shaft $b^{18}$, both of which shafts are extended across the machine and have their bearings in the sides A A'. The sprocket chains are positively driven as herein shown from a main or driving shaft $b^{20}$, supported in the framework and provided at one side of the machine with a fast pulley $b^{21}$ and with a loose pulley $b^{22}$, the said shaft at the opposite side of the machine being provided with a bevel gear $b^{23}$, in mesh with a bevel gear $b^{24}$, mounted on a worm shaft $b^{25}$ supported in suitable brackets or bearings $b^{26}$, the said worm shaft being provided with a worm $b^{27}$, which meshes with a worm gear $b^{28}$ on the sprocket shaft $b^{17}$.

One feature of this invention consists in a novel arrangment of gearing whereby the coloring brushes are positively driven from the main shaft. To effect this result, two longitudinal shafts $c$ $c'$ are extended the length of the machine on one side and like longitudinal shafts $c^2$ $c^3$ are extended in the direction of the length of the machine on its opposite side. These shafts operate to rotate both the body and the end brushes, and inasmuch as each set of brushes is driven in the same manner, I will specifically describe the connection between the brushes of one set and their driving shafts.

Referring to Fig. 1, the brush $a^4$ has its shaft $c^5$ supported in bearings in brackets $c^6$ $c^7$ secured to the sides A A' of the machine, and the said shaft has mounted on it at one end a gear $c^8$ in mesh with a gear or pinion $c^9$ on a shaft $c^{10}$, extended through the side A of the framework and supported in a suitable bracket $c^{12}$ and provided with a bevel gear $c^{13}$, in mesh with a bevel gear $c^{14}$ on the shaft $c$. The brush $a^3$ co-operating with the brush $a^4$ is mounted on a shaft $c^{15}$, which is geared in a similar manner to the driving shaft $c^3$ on the opposite side of the machine, the shaft $c^{15}$ having a gear $c^{16}$, in mesh with a gear $c^{17}$ mounted on a shaft $c^{18}$, provided with a bevel gear $c^{19}$ in mesh with a bevel gear $c^{20}$ on the shaft $c^3$. The inclined or end brushes $a^6$ $a^8$ have their shafts $c^{21}$ $c^{22}$, supported, as herein shown, at one end, in suitable bearings formed in a casting or block $c^{23}$, shown in Fig. 1, as secured to a cross bar $c^{24}$ attached to the sides A A', while the other ends of the shafts $c^{21}$, $c^{22}$ are extended through the sides A A' and are preferably supported in movable boxes $c^{25}$ $c^{26}$, the said shafts being extended beyond the sides of the machine and provided with bevel gears $c^{27}$ $c^{28}$, in mesh with bevel gears $c^{29}$ $c^{30}$ on the shafts $c$ $c^2$. The end brushes $a^5$ $a^7$ are geared in a similar manner to bevel gears on the shafts $c'$ $c^3$. The shafts $c'$ $c^3$ are driven from the main shaft $b^{20}$ by means of bevel gears $c^{30}$ $c^{31}$ on the said main shaft, engaging bevel gears $c^{32}$ $c^{33}$ on the shafts $c'$ $c^3$, while the shafts $c$ $c^2$ are driven from the shafts $c'$ $c^3$ by intermediate mechanism, herein shown as cross belts $c^{35}$ $c^{36}$ passed about suitable pulleys on the said shafts.

From the construction of gearing as above described, it will be seen that both the sprocket chains and the coloring brushes are driven positively from the main shaft $b^{20}$, motion being communicated from the said shaft to the sprocket wheel shaft $b^{17}$ by the bevel gears $b^{23}$ $b^{24}$, worm shaft $b^{25}$, worm $b^{27}$, to the worm gear $b^{28}$ mounted on the shaft $b^{17}$ and by means of the gears $c^{30}$ $c^{31}$, $c^{32}$ $c^{33}$, the longitudinal shafts $c'$ $c^3$ are positively driven, which communicate their motion to the body brushes through the gearing above described and at the same time to the end brushes through the gearing above described, the upper pair of the longitudinal shafts being driven from the lower pair by the cross belts as herein shown.

The longitudinal guide-rods secured to the outside of the sides A A' are inclined or cam-shaped at their rear ends as at $d$, so that, as the sprocket chains pass up from the sprocket wheels $b^{13}$ $b^{14}$, the rollers or wheels $b^5$ will pass up the incline or cams $d$ on the guide rods, and will be forced outward, thereby rendering taut the skin supporting wire or rod in line with the said rollers or wheels. This prevents the support from buckling at the center, which would cause the skin to crease or crinkle at its center. The coloring liquid may be supplied to the brushes from suitable tanks or vessels $f$, suitably supported above the apparatus and provided with an outlet pipe $f'$, connected to branch distributing pipes $f^2$, which may be perforated pipes extended the length of the brushes.

By reference to Fig. 1, it will be seen that the body brushes act on the central or body portion of the skin or hide and the inclined brushes or end brushes act upon the pieces or portions of the hide corresponding to the legs and which are marked 2 3 in Fig. 1. It will be noticed that the end brushes are inclined in the direction corresponding to the inclination or angle of the leg portions or shanks of the skin to the body portion, so that as the skin passes between the inclined brushes in the direction indicated by arrow 20, it is stretched and smoothed out perfectly flat in its natural direction, and is not crimped or crinkled, so that a more efficient, effective and even distribution of the coloring matter is effected.

I prefer to arrange the brushes as shown in Fig. 1 and to move the skin in the direction indicated by arrow 20. By so doing, the skin is first brought in contact with the end brushes, which in their rotation work on the skin near its center and stretch the skin out toward its shanks or ends, thereby placing the skin in the most favorable condition for receiving the coloring liquor, and the skin after being acted upon by the end brushes is brought in contact with the body brush, before the end brushes have finished coloring their portion of the skin, the said end brushes being set sufficiently near to the body brushes to effect this result. In this manner, the skin is held by the body brush and by one or both end brushes, so that if one of the shanks should be smaller than the other and pass from under its coloring brush, before the other shank is colored; the skin will not be crinkled or wrinkled by the coloring brush acting on the longer shank, but will be held firmly by the body brush, until both end brushes have finished their work. Furthermore, it will be noticed that the carrier supporting the skin is moved in a direction opposite to or against the rotation of the brushes, which enables the skin to be uniformly colored as the brushes serve to retard or oppose the travel of the skin, whereas if the skin traveled in the same direction as the rotation of the brushes, the travel of the skin is accelerated and the coloring unevenly effected.

Believing myself to be the first to construct a machine for coloring skins in which the body of the skin is acted upon by one coloring brush, and the shank by a coloring brush set at an angle to the body brush, which angle substantially corresponds to the natural position or direction of the shank, I do not desire to limit my invention to any particular number of brushes or to any particular construction of machine in which said brushes are used, although I prefer the construction of machine herein shown.

I claim—

1. In an apparatus for coloring skins, the combination with a body coloring brush, of end coloring brushes located at the opposite ends of the body brush and set at an angle thereto to operate upon the skin in opposite directions, and a traveling carrier for the skin moving in a direction opposite to the rotation of the brushes substantially as described.

2. In an apparatus for coloring skins, the combination with a pair of body coloring brushes, of a pair of shank or end coloring brushes set at an angle to the body brush, means to rotate said brushes, and a traveling carrier for said skin moving between the brushes in a direction opposite to their rotation substantially as described.

3. In an apparatus for coloring skins, the combination with a pair of body coloring brushes, of additional pairs of shank or end coloring brushes arranged at the opposite ends of the body coloring brushes and set at an angle thereto, traveling endless carriers moving in a direction opposite to or against the rotation of the brushes, a support for the skin secured to said endless carriers and adapted to pass between the brushes, and means to move said brushes, substantially as described.

4. In an apparatus for coloring skins, the combination with a pair of body coloring brushes, of two pairs of shank or end coloring brushes arranged at opposite ends of the body brushes and set at an angle therewith, endless carriers, a skin support secured to said carriers, and gearing to positively drive said carriers and brushes, the said carriers moving in a direction opposite to or against the rotation of the brushes substantially as described.

5. In an apparatus for coloring skins, the combination with a pair of body coloring brushes, of two pairs of shank or end coloring brushes arranged at opposite ends of the body brushes and set at an angle therewith, endless sprocket chains, sprocket wheels about which said chains are passed, longitudinal driving shafts geared to the said brushes, a worm shaft, having a worm in mesh with a gear on a sprocket wheel shaft, and a main shaft geared to the said worm shaft and to the brush driving shafts, substantially as described.

6. In an apparatus for coloring skins, the combination with a pair of body coloring brushes, of two pairs of shank or end coloring brushes arranged at opposite ends of the body brushes and set an an angle therewith, endless carriers, roller or pulley supporting frames attached to said carriers, a skin support secured to said frames, and guide-rods co-operating with the said rollers or pulleys and constructed substantially as described to maintain taut the said skin support while being acted on by the said brushes substantially as described.

7. In a machine for coloring skins, the following instrumentalities in combination;

viz:—a framework, traveling endless carriers supported thereby, roller carrying frames secured to said carriers, a skin support attached to said frames, and guide-rods cam shaped at
5 one end to co-operate with the rollers carried by said frames to render taut the said skin support, substantially as described.

In testimony whereof I have signed my name to this specification in the presence of two subscribing witnesses.

ALBERT F. JONES.

Witnesses:
JAS. H. CHURCHILL,
J. MURPHY.